United States Patent
Frederick et al.

(10) Patent No.: US 10,414,256 B2
(45) Date of Patent: Sep. 17, 2019

(54) DYNAMICALLY CONFIGURABLE TONNEAU COVER

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US); Mark Minelli, Dexter, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 116 days.

(21) Appl. No.: 15/611,853

(22) Filed: Jun. 2, 2017

(65) Prior Publication Data
US 2018/0345768 A1    Dec. 6, 2018

(51) Int. Cl.
*B60R 13/02* (2006.01)
*B60J 7/14* (2006.01)
*B60J 7/19* (2006.01)

(52) U.S. Cl.
CPC .............. *B60J 7/141* (2013.01); *B60J 7/198* (2013.01)

(58) Field of Classification Search
CPC . B60J 7/1621; B60J 7/141; B60J 7/198; B60J 7/08; B60J 7/10; B60J 7/102; B60J 7/104; B60J 7/106; B60J 7/19
USPC .......... 296/100.7, 100.6, 100.09, 36, 43, 13, 296/101, 32, 165; 410/102, 106, 110, 410/116, 101
See application file for complete search history.

(56) References Cited

U.S. PATENT DOCUMENTS

| | | | |
|---|---|---|---|
| 4,313,636 A | 2/1982 | Deeds | |
| 5,464,264 A | 11/1995 | Wilson | |
| 6,227,602 B1 * | 5/2001 | Bogard | B60J 7/141 296/100.06 |
| 6,328,365 B1 * | 12/2001 | Adsit | B60R 9/00 296/148 |
| 6,338,520 B2 * | 1/2002 | Rusu | B60J 7/1621 248/231.51 |
| 6,827,389 B1 * | 12/2004 | Pandorf | B60J 7/141 296/100.02 |
| 7,320,494 B1 * | 1/2008 | Wilson | B60J 7/141 296/100.07 |
| 7,537,264 B2 * | 5/2009 | Maimin | B60J 7/141 296/100.06 |
| 9,079,548 B1 | 7/2015 | Singer | |
| 2015/0197141 A1 | 7/2015 | Cortez | |

\* cited by examiner

*Primary Examiner* — D Glenn Dayoan
*Assistant Examiner* — Sunsurraye Westbrook
(74) *Attorney, Agent, or Firm* — Christopher G. Darrow; Darrow Mustafa PC

(57) ABSTRACT

Embodiments described herein relate to a tonneau cover for a bed of a truck. In one embodiment, the tonneau cover includes a set of panels that span a width of the bed between at least two mounting rails that are attached to sidewalls of the bed. The set of panels detachably connect to the mounting rails at attachment points within the mounting rails and are at least partially supported by the attachment points. Individual panels within the set of panels connect with adjacent ones of the set of panels through a detachable hinge within opposing sides. The individual panels connect to the mounting rails through retractable pins that extend from opposing ends.

20 Claims, 7 Drawing Sheets

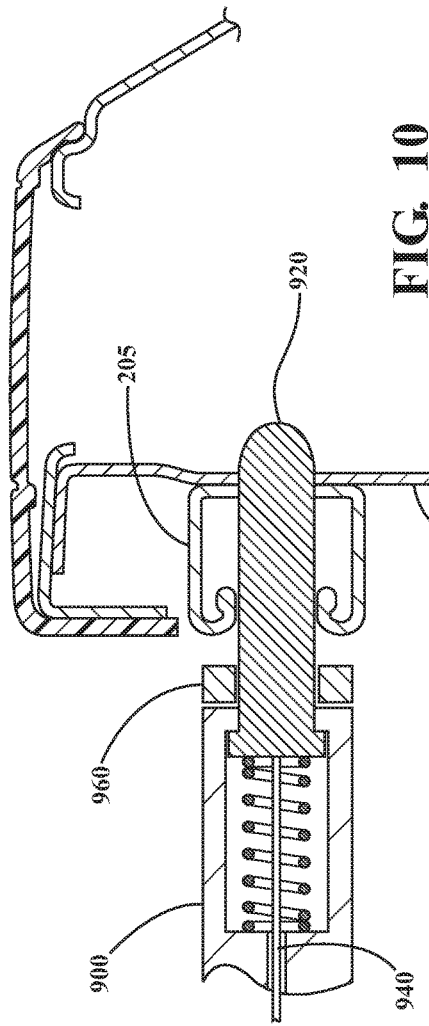
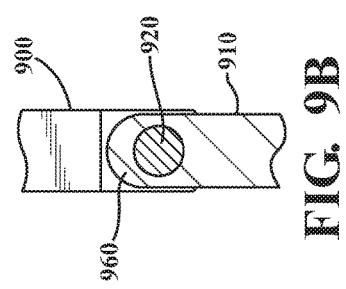
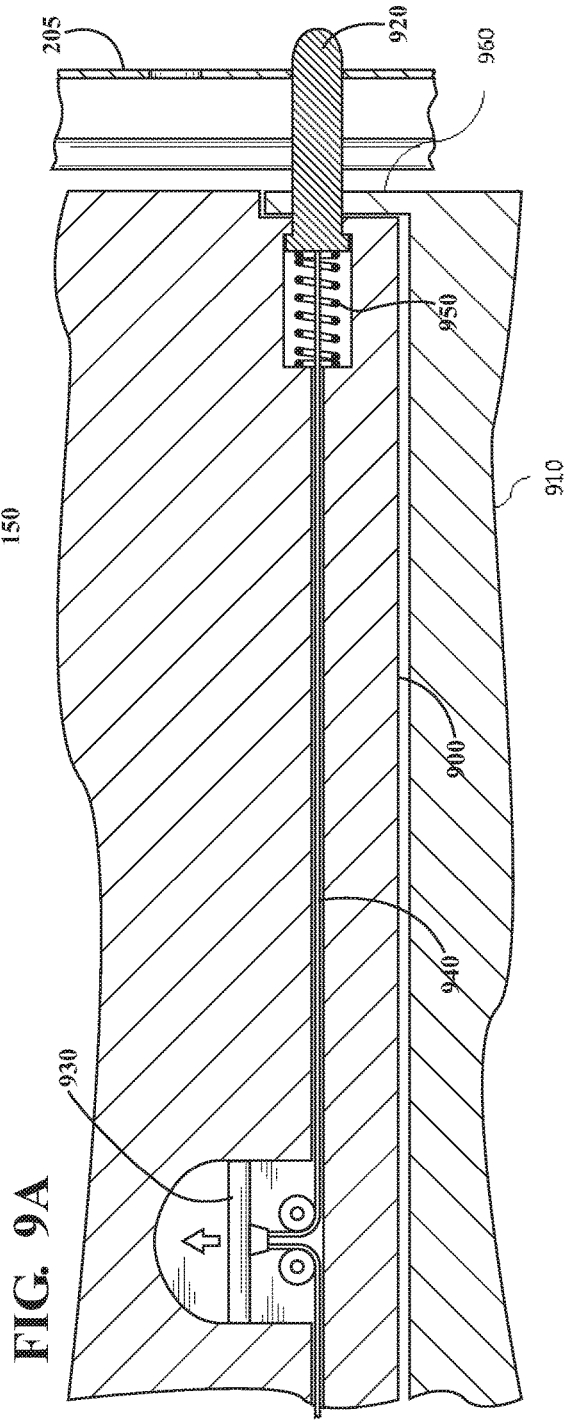
FIG. 10
FIG. 9B
FIG. 9A

DYNAMICALLY CONFIGURABLE TONNEAU COVER

TECHNICAL FIELD

The subject matter described herein relates in general to a cover for a truck bed and, more particularly, to a cover that is configurable into different shapes and positions.

BACKGROUND

Pickup trucks have wide and varied uses both across the population of owners of pickup trucks and for individual owners. For example, pickup trucks are often used for business purposes such as construction for material hauling, service for parts and other merchandise hauling, and so on. Moreover, owners can also use pickup trucks for personal purposes such as home and gardening-related uses, hobby related functions (e.g., carrying ATVs), family related functions (e.g., camping), and so on. Along with these varied uses, owners employ the truck bed for various purposes. Consequently, owners can experience varying needs for covering and segmenting the truck bed. However, a cover which suits multiple purposes that align with the varied uses is generally not available. That is, presently available covers are generally cannot be modified to segment and cover individual sections of the truck bed.

SUMMARY

In one embodiment, a tonneau cover is disclosed that can be dynamically customized into different configurations for different uses without modifying a provided support structure in the truck bed. That is, in one embodiment, the tonneau cover is comprised of multiple panels that are interconnected with one another and with mounting rails that run alongside walls of the truck bed. The panels can be, for example, selectively detached from the mounting rails while remaining connected with adjacent panels in order to permit various portions of the truck bed to be sectioned off, to permit different shapes to be formed using the panels, and to permit the panels of the cover to be stowed in place. In one embodiment, the panels of the cover can be formed into troughs, boxes, and other configurations. In this way, the tonneau cover provides for improved versatility through the ability to form the different shapes and dynamically section off different segments of the truck bed or stow one or more panels of the cover without, for example, modifying a support structure of the cover.

In one embodiment, a cover for a bed of a truck is disclosed. The cover includes at least two mounting rails that are operable to be mounted to respective opposing sidewalls of the bed and including attachment points. The cover includes a set of panels that span a width of the bed between the at least two mounting rails. The set of panels detachably connect to the mounting rails at the attachment points and are at least partially supported by the attachment points. Individual panels within the set of panels connect with adjacent ones of the set of panels through detachable hinges within opposing sides. The individual panels connect to the mounting rails through retractable pins that extend from opposing ends.

In one embodiment, a tonneau cover for a bed of truck is disclosed. The tonneau cover includes a set of panels that span a width of the bed between at least two mounting rails that are attached to sidewalls of the bed. The set of panels detachably connect to the mounting rails at attachment points within the mounting rails and are at least partially supported by the attachment points. Individual panels within the set of panels connect with adjacent ones of the set of panels through a detachable hinge within opposing sides. The individual panels connect to the mounting rails through retractable pins that extend from opposing ends.

In one embodiment, a cover for a bed of a truck that can be configured into different shapes is disclosed. The cover includes a set of panels that span a width of the bed between at least two mounting rails that are attached to sidewalls of the bed. The set of panels detachably connect to the mounting rails at attachment points within the mounting rails and are at least partially supported by the attachment points. Individual panels within the set of panels connect with adjacent ones of the set of panels through detachable hinges within opposing sides of the individual panels. The individual panels connect to the mounting rails through retractable pins that extend from opposing ends. One or more panels of the set of panels are configurable to be disconnected from the at least two mounting rails while remaining connected to the adjacent ones of the set of panels to form a trough within the cover. One or more panels of the set of panels are configurable to be disconnected from the at least two mounting rails while remaining connected to adjacent ones of the set of panels to form a rectangular box within the cover.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 9A is a diagram illustrating a cross-section of one embodiment of a retractable pin within an exemplary panel.

FIG. 9B is a diagram illustrating an example interconnection between two panels.

FIG. 10 is a diagram illustrating the exemplary panel of FIG. 9A from a side view.

DETAILED DESCRIPTION

Systems, methods and other embodiments associated with a dynamically configurable cover for a truck bed are disclosed. As mentioned previously, pickup trucks and, more specifically, beds of pickup trucks can be used for a wide variety of purposes. For example, an owner or operator of a pickup truck can use the bed for hauling different materials, transporting goods, carrying personal items, and so on. Thus, from one use to the next, a cover of the truck bed may need to serve different purposes. That is, in one instance the truck bed may need to be fully open and accessible for hauling bulk materials (e.g., mulch), whereas in a subsequent use a rear section or forward section may be used to haul bulky items (e.g., bicycles) while other sections may be used to carry smaller personal items. In still further circumstances, contents of the bed may need to be secured. Moreover, various combinations of these configurations may also be desirable.

Therefore, in one embodiment, a dynamically configurable truck bed cover is disclosed. In general, the disclosed cover, also referred to as a tonneau cover, is configured such that panels that make up the cover can be selectively attached or detached to the truck bed in order to provide for arranging the cover in different configurations that suit different purposes. For example, in one embodiment, panels that comprise the cover are designed to interconnect through hinge joints that permit the panels to rotate in relation to adjacent panels in both an upward or downward direction. Moreover, the panels are also configured with attachment pins on opposite ends that face sidewalls of the truck bed. These attachment pins are, for example, retractable such that the pins can engage with attachment point in a mounting rail of the truck bed when the panel is to be supported in, for example, a cover position or can be disengaged to permit the cover to be configured otherwise.

Accordingly, by selectively attaching and detaching various panels from the mounting rails while maintaining the interconnections between panels, the cover can be configured into different shapes/positions. For example, the cover can be configured to form a box that can store items, the cover can be configured to cover a selected segment of the truck bed, the cover can be configured with a trough between panels, the cover can be stowed in a selected portion of the bed while still, at least partially, connected with the mounting rails, and so on. In still further embodiments, the panels can be selectively detached from adjacent panels to form a gap within the cover to selectively segment the truck bed and/or to form a portion of the cover into a box while further panels remain to cover the truck bed. In this way, the disclosed cover provides a versatile solution for segmenting, covering, and securing the truck bed.

Figure 1:
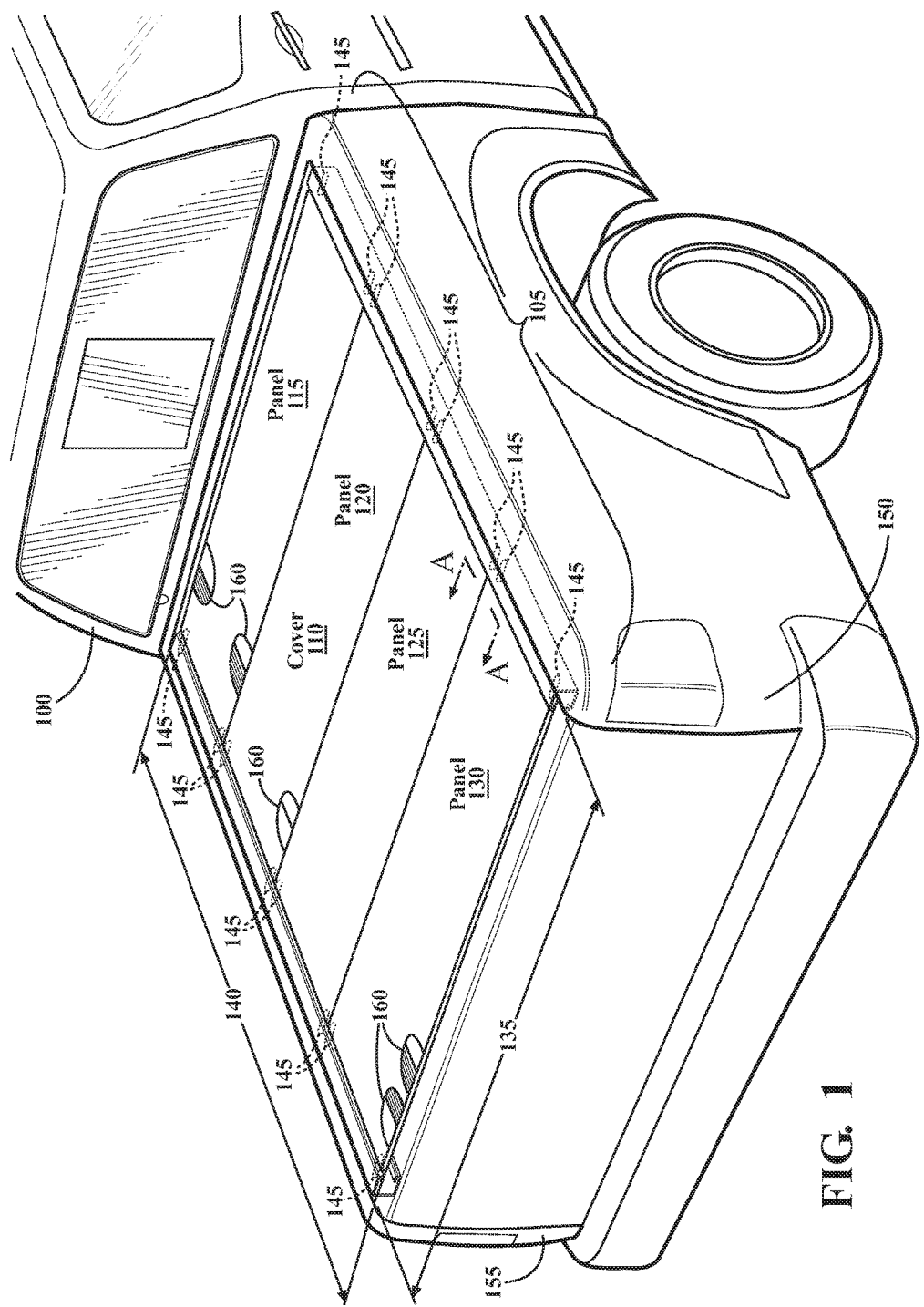
FIG. 1 illustrates an isometric view of one embodiment of a truck bed including panels of a cover for the truck bed.

Referring to FIG. 1, one embodiment of a truck 100 with a truck bed 105 is illustrated. As shown in FIG. 1, the truck bed 105 is covered with a cover 110 that is comprised of individual panels 115, 120, 125, and 130. It should be appreciated, that while four separate panels are illustrated, in various embodiments, the number of panels can vary, can be dynamically modified by adding or removing panels, and respective sizes of the panels can also vary. For example, as illustrated, the four panels 115, 120, 125, and 130 span a width 135 of the bed 105 and equally divide a length 140 of the bed 105. However, in various embodiments, the length 140 can be divided unequally among the provided panels. That is, in one embodiment, additional panels that form the cover 110 can be provided, and some of the panels may be equal in size along the length 140 while one or more panels may have a different size along the length 140. In general, a size of individual panels along the length 140 is selected to provide a set of panels that can completely cover the bed 105.

However, in further aspects, the number of panels and amount of coverage in the length 140 of the bed 105 can be varied according to personal preference and/or other aspects of the particular implementation. For example, a particular owner may have multiple sets of panels that overall would extend beyond the length 140, are less than the length 140, and so on. In either case, in one embodiment, different panels can be added or removed to accommodate a particular configuration and/or additional panels can be stowed while connected with the cover 110 in a desired location (e.g., behind a passenger compartment) within the bed 105.

Furthermore, as shown in FIG. 1, the panels 115-130 are illustrated with attachment points 145 that connect the panels 115, 120, 125, and 130 into mounting rails (not illustrated) on the opposing sidewalls 150 and 155 of the truck bed 105. Thus, the panels 115, 120, 125, and 130 are generally shown as spanning the width 135 of the bed 105. However, in further embodiments, panels that comprise the cover 110 can partially span the width 135 thereby leaving an opening within the cover and/or partial panels can be paired with companion panels that account for the partial span. Moreover, while the panels 115-130 are illustrated as including multiple ones of the attachment points 145 per panel, the panels 115-130 can include different configurations of the attachment points 145 according to a particular implementation. That is, the attachment points 145 can be centered within the panels 115-130, located proximate to corners of the panels 115-130, and so on.

Additionally, FIG. 1 further illustrates locking mechanisms 160 in different possible configurations within the panels 115, 120, and 130. In general, the locking mechanisms 160 are implemented to prevent the panels 115-130 from being lifted or otherwise removed without an appropriate key or other access means (e.g., RFID chip). In either case, the locking mechanisms 160 can take any necessary form to prevent the panels from being disengaged from the mounting rails when locked. As a brief listing of examples, the locking mechanisms 160 can include a cylinder lock, a cam lock, a latch lock, or another suitable means for locking the panels 115-130 in place.

Figure 2:
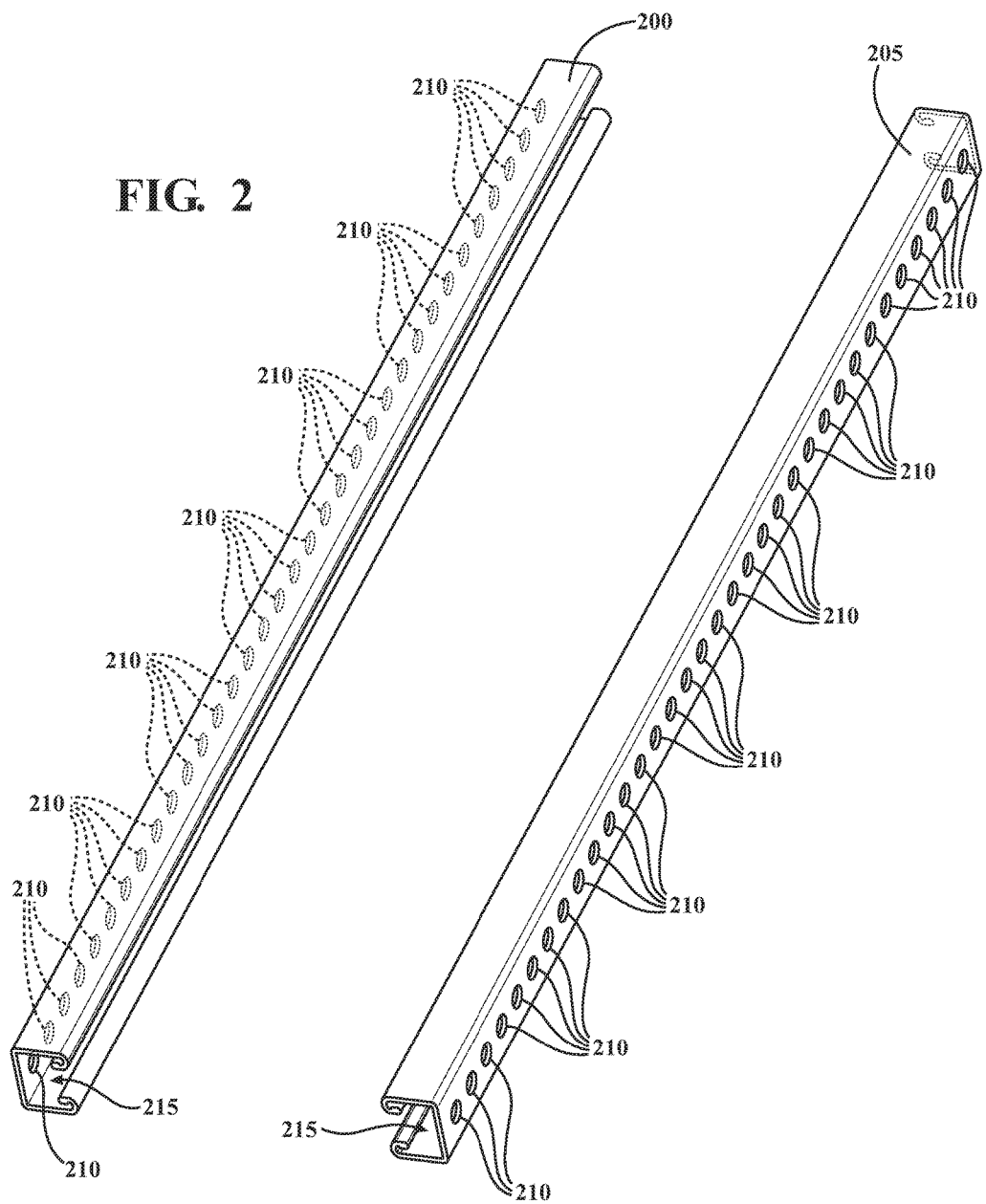
FIG. 2 illustrates one view of a mounting rail as discussed herein.

With reference to FIG. 2, two separate views of an example mounting rails 200 and 205 are illustrated. The mounting rails 200 and 205 are illustrated with holes 210 generally centered within the channels 215 and evenly spaced along a length. In further embodiments, the holes 210 can be spaced according to a spacing of pins within the panels 115-130. Moreover, in one embodiment, the channels 215 are generally c-shaped and can accept various types of connectors. However, as envisioned, the panels that comprise the cover 110 generally include pins extending from opposing ends that protrude through the channels 215 of the mounting rails 200 and 205 and into ones of the holes 210 that align with the pins. In various embodiments, the holes 210 can be provided in various patterns and/or numbers along the mounting rails 200 and 205 to permit attaching the panels 115-130 in different locations and configurations as may be desired. In still further aspects, the mounting rails 200 and 205 may be provided without the holes 210. In such a case, the channel 215 may be configured to support the panels 115-130.

Furthermore, while two mounting rails are illustrated that generally correlate with opposing sides of the truck bed 105, it should be appreciated that mounting rails may also be installed on a tailgate or proximate to the tailgate of the truck bed 105 and/or behind the passenger compartment to facilitate further configurations and/or to prevent movement of the cover 110 along the length 140 of the bed 105. Furthermore, the mounting rails 200 and 205 are generally mounted on the bed 105 such that when the panels 115-130 are installed a top surface of the panels is substantially flush with a top of the sidewalls of the bed 105.

Figure 3:
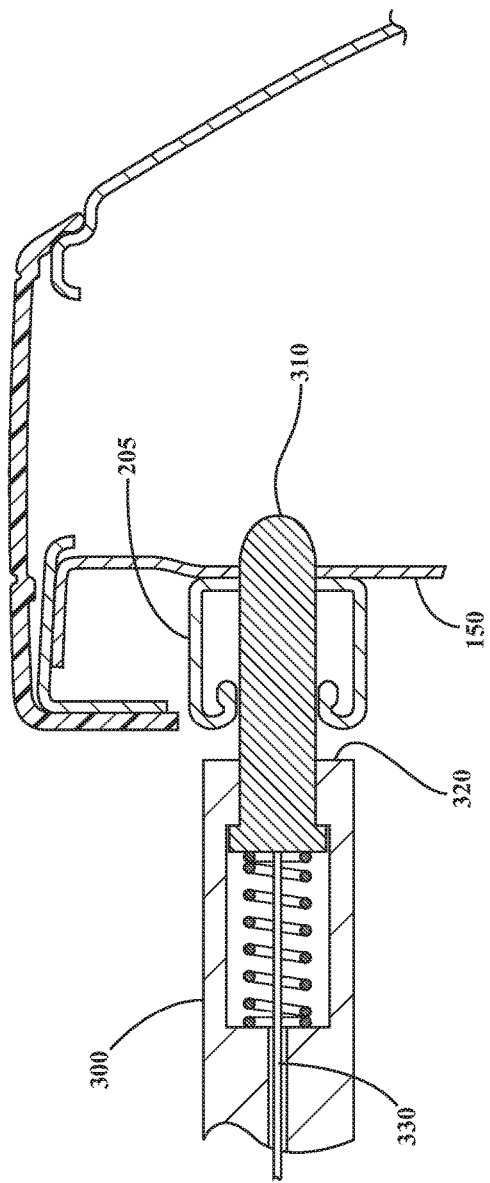
FIG. 3 is a diagram illustrating a cross-section of a mounting rail with an attachment point and a retractable pin of a panel engaged therein.

With reference to FIG. 3, one embodiment of a panel 300 that is, for example, similar to the panels 115, 120, 125, and 130 is illustrated. The panel 300 is shown with a locking pin 310. As illustrated in FIG. 3, a cross-section along the width 135 of the bed 105 is shown with the sidewall 150 and the mounting rail 205. As illustrated, the mounting rail 205 is fixed under a lip of the sidewall 150. Furthermore, the pin 310 of the panel 300 is shown as being extended through one of the holes 210 in the rail 205. Furthermore, the pin 310 is a spring-loaded pin that remains extended from an edge 320 of the panel 300 unless manually retracted via a cable 330. Thus, the mounting rail 205 supports the panel 300 through the connection by the pin 310.

Figure 4:
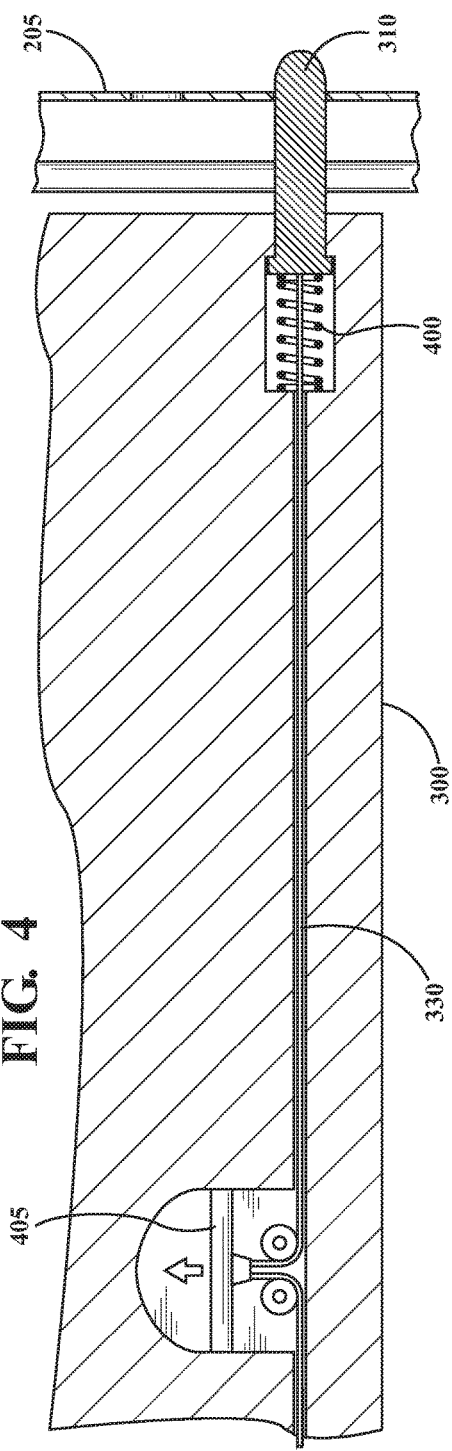
FIG. 4. is a diagram illustrating a retractable pin of a panel that is engaged with a mounting rail.

As a further example of the mechanism within the panel 300 that includes the pin 310, consider FIG. 4, which illustrates another view of the panel 300. In FIG. 4, the panel 300 is illustrated as including a spring 400 and a handle 405 that when lifted retracts the pin 310 from being engaged/attached to the rail 205 and thus disengages the panel 300 from the rail 205. In one embodiment, the handle 405 is embedded within the panel 300 and is generally flush with the panel 300 when not engaged. Accordingly, when the handle 405 is released, the spring 400 exerts a force on the pin 310 that causes the pin 310 to extend from the edge of the panel 300. Moreover, the handle 405 can be situated in either an upper surface of the panel 300 that is exposed within an upper surface of the cover 110 or can be disposed within an underside of the cover 110 such that the handle is accessible when, for example, a tailgate is opened. In either case, the handle 405 can be provided with a locking mechanism similar to that discussed with FIG. 1 as the locking mechanism 160 in order to prevent the panel 300 from being disengaged.

As an additional matter, even though a single pin 310 is discussed in relation to the panel 300, it should be appreciated that the panel 300 includes at least one pin per side. That is, each side of the panel 300 that extends to the sidewall 150 and the sidewall 155 includes at least one pin for connecting and supporting the panel. In further embodiments, each respective one of the panels can include two or more pins per outward edge. Additionally, a particular spacing and/or location of the pins along the edge can be selected to, for example, provide appropriate support for the panel 300, secure the panel 300 from intrusion, and so on. As still a further matter, the outward edges of the panels may include gaskets and/or the mounting rails 200/205 may include gaskets in order to seal the cover 110 from water intrusion into the bed 105.

Figure 5:
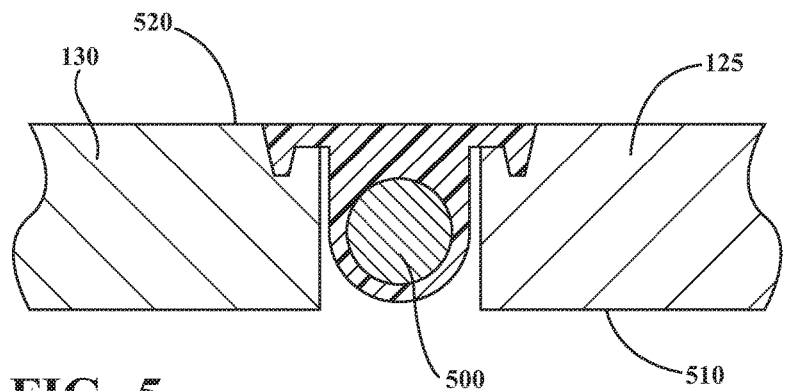
FIG. 5 is a diagram of cross section A-A from FIG. 1 that illustrates a hinge between two panels.

Moreover, even though the panels 115, 120, 125, and 130 may be disengaged from the mounting rails 200/205, the respective panels are still interconnected with adjacent panels through a hinge. For example, and with reference to FIG. 5, cross-section A-A from FIG. 1 is illustrated that depicts panels 130 and 125. The illustration of FIG. 5 further details a hinge 500 that permits the panel 130 and the panel 125 to fold flat against either an under surface 510 or an upper surface 520. Thus, the hinge 500 permit a full rotation of the panels 130 and 125 about the hinge 500. As a result of this configuration, the panel 130 can be rotated on top of the cover 110, swung up under the cover, rotated to hang vertically below the cover into the bed 105, rotated to stand vertically above the cover 110, and so on. In general, the hinge 500 is configured in a manner to permit the panels 130 and 125 to be arranged/positioned in many different arrangements. Moreover, the connections between further panels (e.g., 125-120, 120-115, etc.) includes a similar hinge as the hinge 500. In still further aspects, the hinge 500 can be implemented to limit rotation in a single direction and/or to a certain extent (e.g., 90 degrees) to accommodate particular features of an implementation.

As an additional attribute of the hinge 500, a pin or rod that extends within the hinge 500 is removable. Thus, the noted rod of the hinge 500 can be removed and the panels 130 can be separated, if desired. Moreover, in one embodiment, additional panels (e.g., smaller, larger, partial panels, etc.) can be added or substituted to facilitate further configurations.

Figure 6:
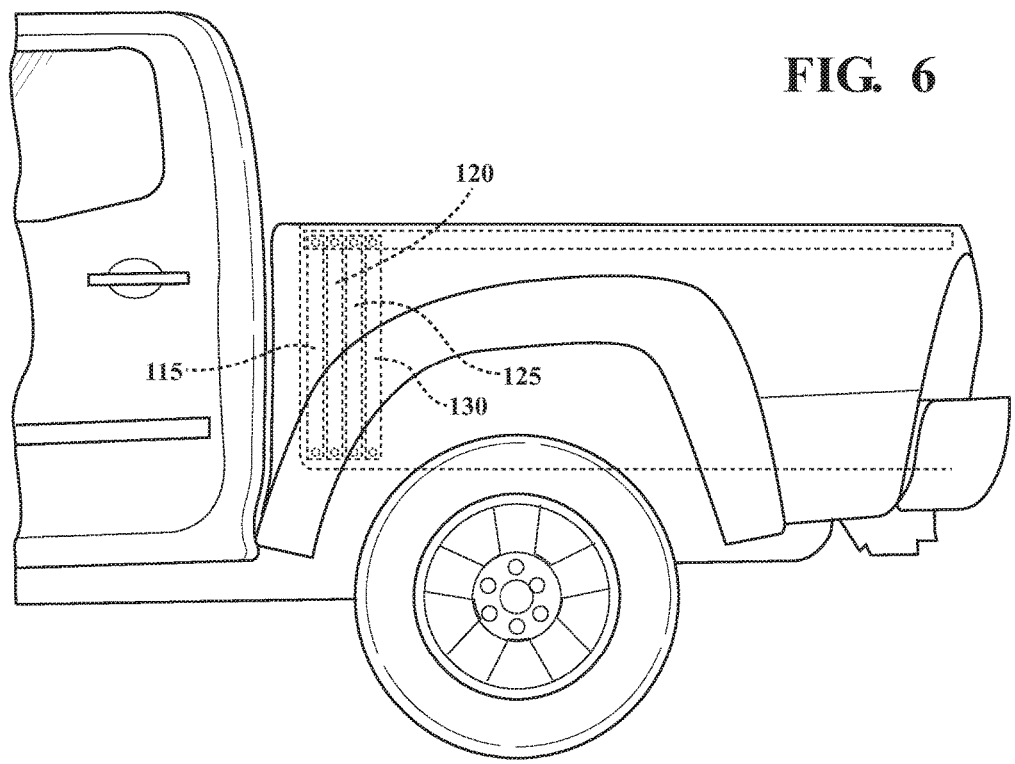
FIG. 6 illustrates a side-view of a truck bed with panels of a cover in a stowed position.

As one example of how select panels can be detached from the mounting rails 200 and 205, consider FIG. 6. FIG. 6 illustrates the panels 115, 120, 125, and 130 in a stowed position within the bed 105 behind a passenger compartment of the truck 100. Thus, to achieve the stowed configuration as shown in FIG. 6, in one embodiment, alternating pins are retracted to disengage at least part of a portion of the panels so that the panels can be folded together in vertical arrangement while hanging in the truck bed 105. In this way, the pins that remain engaged support the panels 115-130 along with the interconnects between the panels, but the panels are permitted to hang vertically within the bed 105 and provide for exposing a remaining rear section of the bed 105.

Figure 7:
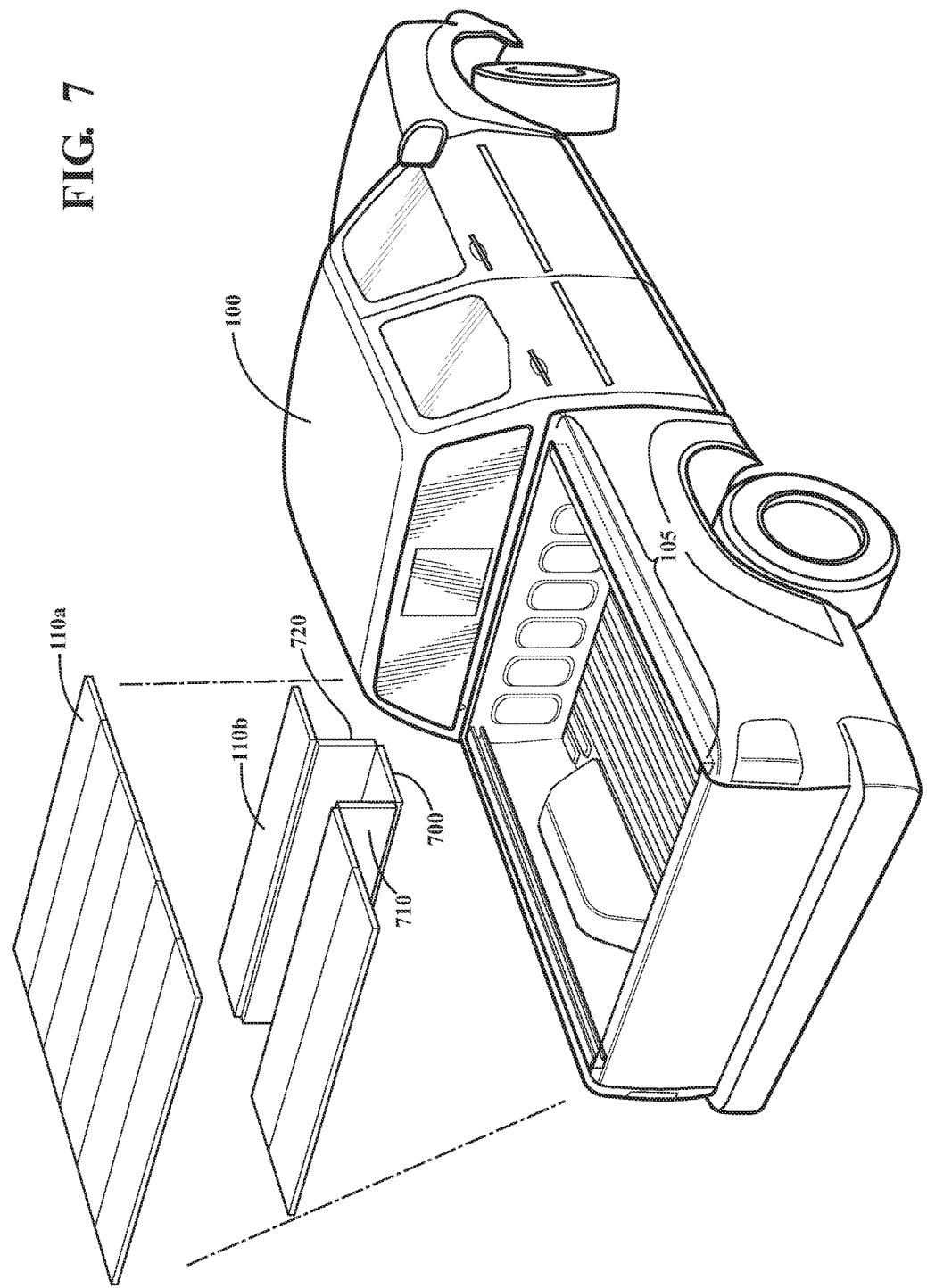
FIG. 7 illustrates an isometric view of different configurations of a cover for a truck bed.

As shown in FIG. 7, the cover 110 is illustrated with six panels. Furthermore, a first configuration of the cover is labeled 110a. In this configuration, all of the panels that comprise the cover 110 are engaged with the mounting rails. By contrast, a configuration of the cover 110b illustrates a trough where three panels form an indentation within the cover 110. To achieve the configuration of 110b, a center panel 700 is fully disengaged from the mounting rails, whereas (depending on a particular implementation) adjacent panels 710 and 720 are, for example, partially disengaged to permit panels 710 and 720 to hang vertically while the panel 700 provides a horizontal surface of the noted trough. In further embodiments, depending on a number and configuration of attachment pins within each panel, the panels 710 and 720 may be fully disengaged from the mounting rails and are thus supported via the interconnects (e.g., hinges) to adjacent panels that remain engaged with the mounting rails.

Figure 8:
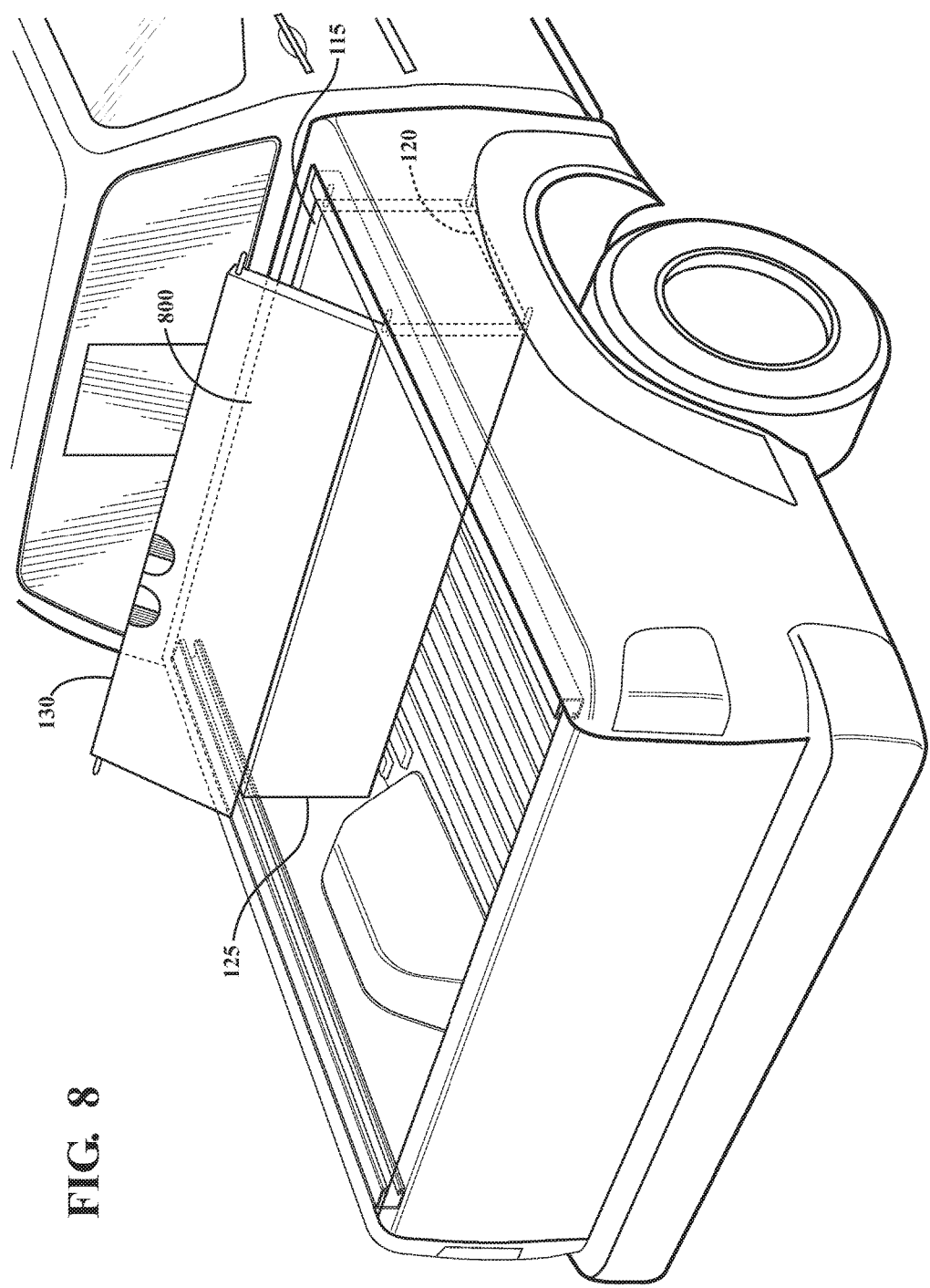
FIG. 8 illustrates one embodiment of a cover in a box configuration.

As a further example of how the cover 110 of FIG. 1 can be configured consider FIG. 8. FIG. 8 illustrates the four panels 115, 120, 125, and 130 of FIG. 1 in a box 800 configuration. That is, panel 120 is disengaged with the mounting rails along with at least a portion of the pins from 115 and 125. Thus, as shown, panels 115 and 125 are folded down to form vertical side walls of the box 800. The panel 130 is temporarily disengaged and folded back to form a top surface of the box 800. That is, panel 130 is hinged backward and re-attached to the mounting rails to form a top surface of the box 800. In further aspects, the panel 130 can attach to an additional mounting rail at a rear of the bed 105 in order to secure the box 800. Moreover, while shown in a configuration that extends down into the bed 105, in further configurations, the box 800 can be formed above the mounting rails. Of course, when formed above the mounting rails, additional end caps may be attached to the panels 115-130 to provide a full enclosure. In further aspects, additional panels may be provided within the configuration of the cover that provide for the box 800 including additional top and/or bottom surface panels to form, for example, a rectangular box.

Furthermore, depending on a length of panels used to form the box 800, the box may hang above a surface of the bed 105 to permit materials and/or other items to be stowed under the box when the box hangs into the bed 105. In further aspects, the panels may be configured of an odd number of sides and have sloping sides (e.g., trapezoid style). In still further aspects, the panels may be removed from the mounting rails and formed into a mobile box that is not attached to the mounting rails or the bed 105. In such a configuration, additional end caps may be attached to provide further structural stability and to fully enclose the box 800.

As an additional matter, the panels of the cover 110 can be formed from various materials including, but not limited to polymers, plastics, metals, metal alloys, resins, fiberglass, fabrics over rigid frames, and so on. In general, the panels of the cover 110 are manufactured to have a rigid construction that provides stability and support when using the panels to store items, support items/materials, provide security, provide aerodynamics, and so on.

With reference to FIG. 9A, an additional embodiment of the panel 300 are illustrated. As shown in FIG. 9A, a panel 900 is illustrated as being attached to an adjacent panel 910. The panels 900 and 910 are similar to the panel 300 of FIG. 3. For example, the panel 900 includes a retractable pin 920, a handle 930, and a cable 940. The cable 940 is operably connected to the handle 930 and to the retractable pin 920 through a spring 950. As with the panel 300, the retractable pin 920 of the panel 900 remains in an extended position absent a force exerted through the cable 940 via the handle 930. Moreover, a detachable hinge 960 of the panel 910 extends into a slot in the panel 900 and acts as an attachable point between the panels 900 and 910 with the pin 920 extending through a hole in the hinge 960 as illustrated in FIGS. 9A and 9B.

Accordingly, in one embodiment, the panel 900 includes an indicator of different positions for the retractable pin 920. That is, the panel 900 can include a first indicator for retracting the pin 920 to remove the pin 920 from the rail 205 and a second indicator for removing the pin 205 from the hinge 960. In one embodiment, the indicators are markings, stop points, clicks activated by movement of the pin 920 past stop points, and so on. For example, as shown in FIG. 10, when the pin is retracted past the rail 205 an initial stop point may be encountered that is felt or heard by an operator of the handle 930. Thereafter, if the handle 930 is further activated to retract the pin 920 past the hinge 960, another stop point may be encountered as the pin 920 bottoms out on the spring 950.

In this way, the panel 900 can be removed from the rail 205 without removing the panel 900 from the adjacent panel 910. As a further matter, the form of attachment between adjacent panels as illustrated in FIGS. 9A, 9B and 10 can be repeated between other panels that form the cover 110. As still a further matter, a seam between the panel 900 and the panel 910 can include a seal or other mechanism to prevent intrusion of water.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to employ the various aspects herein in different arrangements to achieve the noted functionality. Further, the terms and phrases used herein are not intended to be limiting but rather to provide an exemplary explanation of possible implementations. Various embodiments are shown in FIGS. 1-10, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

It will be understood by one having ordinary skill in the art that construction of the described invention and other components are not limited to any specific material. Other exemplary embodiments of the invention disclosed herein may be formed from a wide variety of materials, unless described otherwise herein. For example, the panels 115, 120, 125, and 130, and other components can be formed from various resins, polymers, fabrics, metals, metal alloys, combinations of the noted materials, and so on.

As used herein, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A cover for a bed of a truck, comprising:
   at least two mounting rails that are mountable to respective opposing sidewalls of the bed and including attachment points configured to receive attachment pins; and
   a set of panels that span a width of the bed between the at least two mounting rails, wherein the set of panels detachably connect to the mounting rails at the attachment points and are at least partially supported by the attachment points by the attachment pins,
   wherein individual panels within the set of panels connect with adjacent ones of the set of panels through detachable hinges within opposing sides that are at least partially formed from the attachment pins, and
   wherein the individual panels connect to the mounting rails with the attachment pins that are retractable and extend from opposing ends of the individual panels.

2. The cover of claim 1, wherein one or more panels of the set of panels are configurable to be disconnected from the at least two mounting rails while remaining connected to the adjacent ones of the set of panels to form a trough within the cover.

3. The cover of claim 1, wherein one or more panels of the set of panels are configurable to be disconnected from the at least two mounting rails while remaining connected to the adjacent ones of the set of panels to form a rectangular box within the cover.

4. The cover of claim 3, wherein the rectangular box extends above the at least two mounting rails.

5. The cover of claim 3, wherein the rectangular box extends below the at least two mounting rails.

6. The cover of claim 1, wherein one or more panels of the set of panels are configurable to be selectively detached from the at least two mounting rails to cause the set of panels to hang vertically together from the at least two mounting rails and stow in a selected area of the bed.

7. The cover of claim 1, wherein the mounting rails include a channel that is substantially c-shaped and extends outward from the sidewalls.

8. The cover of claim 7, wherein the attachment points are continuous along the at least two mounting rails and are formed from the channel.

9. The cover of claim 1, wherein the attachment points are holes within a channel of the at least two mounting rails, and wherein one or more panels within the set of panels have different lengths along the bed from other panels in the set of panels.

10. The cover of claim 1, wherein the attachment pins are spring loaded pins that are connected to a handle that is configured to move the attachment pins in order to attach or detach individual ones of the set of panels from the at least two mounting rails.

11. The cover of claim 1, wherein the set of panels are comprised of a rigid construction, wherein the detachable hinges of the adjacent ones of the set of panels are connected with at least a removable rod and the attachment points, and wherein the detachable hinges provide for individual ones of the set of panels to have a range of motion that is about three-hundred and sixty degrees about the detachable hinge.

12. The cover of claim 11, wherein one or more panels of the set of panels include a lock that locks the one or more panels to the at least two mounting rails and prevents the one or more panels from being detached.

13. A tonneau cover for a bed of a truck, comprising:
a set of panels that span a width of the bed between at least two mounting rails that are attached to sidewalls of the bed, wherein the set of panels detachably connect to the mounting rails at attachment points within the at least two mounting rails and are at least partially supported by the attachment points,
wherein individual panels within the set of panels connect with adjacent ones of the set of panels through a detachable hinge within opposing sides,
wherein the individual panels connect to the mounting rails through retractable pins that extend from opposing ends.

14. The tonneau cover of claim 13, wherein one or more panels of the set of panels are configurable to be disconnected from the at least two mounting rails while remaining connected to the adjacent ones of the set of panels to form a trough within the tonneau cover, and wherein one or more panels of the set of panels are configurable to be disconnected from the at least two mounting rails while remaining connected to adjacent ones of the set of panels to form a rectangular box within the tonneau cover.

15. The tonneau cover of claim 14, wherein the rectangular box extends above the at least two mounting rails or below the at least two mounting rails.

16. The tonneau cover of claim 13, wherein the at least two mounting rails include a channel that is substantially c-shaped and extends outward from the sidewalls, wherein the attachment points are continuous along the at least two mounting rails and are formed from the channel.

17. The tonneau cover of claim 13, wherein the retractable pins are spring loaded pins that are connected with a handle that is configured to move the retractable pins in order to attach or detach individual ones of the set of panels from the at least two mounting rails.

18. The tonneau cover of claim 13, wherein the set of panels are comprised of a rigid construction, and wherein the detachable hinges of the adjacent ones of the set of panels are connected with a removable rod, and wherein the detachable hinges provide for individual ones of the set of panels to have a range of motion that is about three hundred and sixty degrees.

19. The tonneau cover of claim 18, wherein one or more panels of the set of panels include a lock that locks the one or more panels to the at least two mounting rails and prevents the one or more panels from being detached.

20. A cover for a bed of a truck that can be configured into different shapes, comprising:
a set of panels that span a width of the bed between at least two mounting rails that are attached to sidewalls of the bed, wherein the set of panels detachably connect to the mounting rails at attachment points within the mounting rails and are at least partially supported by the attachment points,
wherein individual panels within the set of panels connect with adjacent ones of the set of panels through detachable hinges within opposing sides of the individual panels, wherein the individual panels connect to the mounting rails through retractable pins that extend from opposing ends,
wherein one or more panels of the set of panels are configurable to be disconnected from the at least two mounting rails while remaining connected to the adjacent ones of the set of panels to form a trough within the cover, and wherein one or more panels of the set of panels are configurable to be disconnected from the at least two mounting rails while remaining connected to adjacent ones of the set of panels to form a rectangular box within the cover.

* * * * *